May 22, 1956     M. E. SANDLAND     2,746,629
LOG SKIDDING SLED DEVICE Filed Feb. 1, 1952     9 Sheets-Sheet 1

Fig. 1

INVENTOR.
Milton E. Sandland
BY Greek Wells
Atty.

May 22, 1956 M. E. SANDLAND 2,746,629
LOG SKIDDING SLED DEVICE
Filed Feb. 1, 1952 9 Sheets-Sheet 4

Fig.4

INVENTOR.
Milton E. Sandland
BY Greek Wells
Atty.

May 22, 1956  M. E. SANDLAND  2,746,629
LOG SKIDDING SLED DEVICE
Filed Feb. 1, 1952  9 Sheets-Sheet 5

INVENTOR.
Milton E. Sandland
BY
Stuhlwells
Atty.

May 22, 1956

M. E. SANDLAND 2,746,629

LOG SKIDDING SLED DEVICE

Filed Feb. 1, 1952

INVENTOR.
Milton E. Sandland
BY
Atty.

May 22, 1956  M. E. SANDLAND  2,746,629
LOG SKIDDING SLED DEVICE
Filed Feb. 1, 1952  9 Sheets-Sheet 7

INVENTOR.
Milton E. Sandland
BY
Atty.

May 22, 1956

M. E. SANDLAND

2,746,629

LOG SKIDDING SLED DEVICE

Filed Feb. 1, 1952

INVENTOR.
Milton E. Sandland
BY
Struk Wells
Atty.

May 22, 1956  M. E. SANDLAND  2,746,629
LOG SKIDDING SLED DEVICE
Filed Feb. 1, 1952  9 Sheets-Sheet 9

INVENTOR.
Milton E. Sandland
BY Greek Wells
Atty.

United States Patent Office 2,746,629
Patented May 22, 1956

2,746,629
LOG SKIDDING SLED DEVICE
Milton E. Sandland, Seeley Lake, Mont.

Application February 1, 1952, Serial No. 269,387

8 Claims. (Cl. 214—523)

The present invention relates to improvements in a log skidding sled device.

It is the purpose of my invention to provide a log skidding device on which the logs may be loaded so that the front ends of the logs are supported on the device and the rear ends drag, the skidder embodying a base frame which may be wheel supported, in combination with a bunk on which the logs rest, the bunk being mounted on the frame to stand upright when loaded and dragging the logs, and to lie down when the logs are released for unloading, together with a roller forming part of the bunk and engaged by the logs in the down position of the bunk, whereby the frame may be drawn from beneath the logs.

In the skidding of logs it is customary to utilize a self propelled vehicle such as a track laying type and some additional vehicle structure or part of the track laying vehicle, to which several logs may be attached for transporting them from the place where they are cut to a loading dock. It is customary to provide the powered vehicle with a cable and log tongs that can be taken out some distance from the vehicle to drag a number of logs close to the vehicle. The most commont devices used to convey the several logs behind the vehicle to the loading dock, utilize individual supporting cables for the several logs. After the tongs drag a log close to the vehicle, a "choker cable" is run around each individual log and hooked upon itself and the choker cable is then drawn up tight by a drum on the vehicle to support the front end of the individual log. A number of logs are thus tied up by choker cables for the trip to the loading place. In some instances a powered vehicle itself may have the supporting means for the choker cables and logs. In other instances the logs are suspended from a framework which is towed by the powered vehicle. Examples of different machines of this character are found in such patents as the Walker Patent No. 1,920,613, the Heaton Patent No. 1,874,007 and the McNeil Patent No. 2,305,630. All of the devices using choker cables with which I am familiar, have difficulties because of the time necessary to attach the individual cables, the loss of time at the loading place in releasing the logs and the breakage of the several choker cables.

In bad log skidding conditions where steep hills which are wet or snowy, and sharp turns must be negotiated, the choker pulled logs cause difficulties because the logs sometimes run past the vehicle or around a stump. Skid pans and wheeled log bunks have been used to support the front ends of the logs but these do not solve the problem.

According to my invention, I provide a skidding frame which may serve either as a skid pan to slide on the ground and be drawn by the powered vehicle, or be wheel supported at one end and vehicle supported at the other. With this base frame I employ a novel bunk construction which embodies a toothed log supporting bar and a roller arranged side by side with means for securing the bunk with the toothed bar uppermost when the logs are being loaded and dragged to the unloading place. The device embodies a suitable mechanism for releasing the bunk so as to allow the log supporting bar to drop down and the roller to engage the logs so that the base frame and bunk can move out from under the logs which will be held back by the engagement of their rear ends with the ground. The bunk and base frame carry means for securing the bunk in log dragging position and returning it to log dragging position after the logs are unloaded. In addition, the device embodies a squeeze cable which can be placed around all of the logs and drawn tight by a winch on the powered vehicle. The operating mechanism includes means for automatically releasing the squeeze cable when the bunk is released to permit the logs to unload.

It is also a purpose of my invention to provide in a log skidding device a simple, novel means for converting the base frame to and from a wheel supported frame without otherwise interfering with its use.

A further purpose of the present invention is to provide in a log skidding device of this character, a simple, novel steering arrangement operable when the device is wheel supported, to direct the wheels properly for following the towing vehicle.

It is also the purpose of the invention to provide the device with a simple braking mechanism which can be utilized to retard sliding of the base frame when it is used as a skid pan to slide directly on the ground.

The nature and advantages of my invention will appear more fully from the following description and the accompanying drawings wherein a preferred embodiment of the invention is shown. It should be understood however, that the drawings and description are illustrative only and are not intended to limit the invention except insofar as it is limited by the claims.

Figure 1:
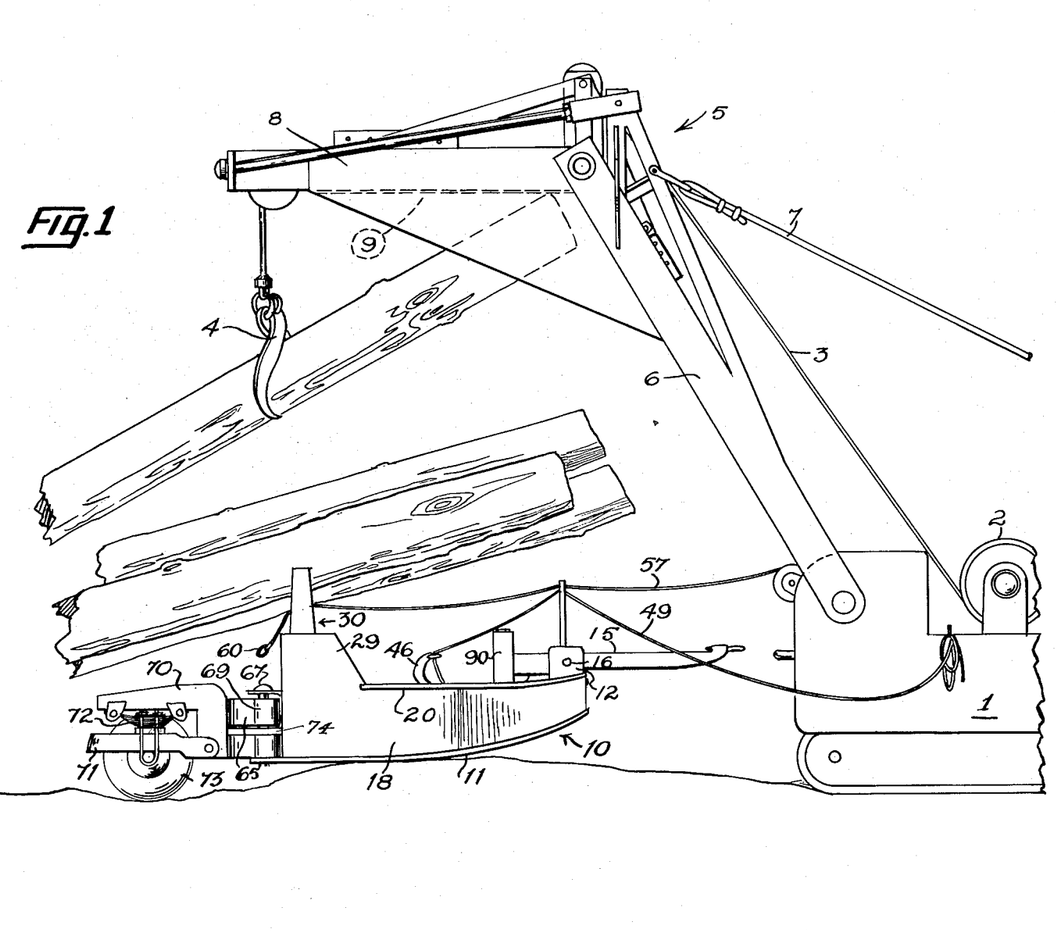
Figure 1 is a view in side elevation of the log skidding device showing how it is loaded.

Referring now in detail to the drawings, my invention is shown in Figure 1 in connection with a powered towing vehicle indicated generally by the numeral 1. This vehicle has a winch 2 thereon for operating a cable 3 which has log tongs 4 for attaching and dragging a log up to loading position. The mechanism for bringing the logs up to loading position includes the log boom 5, having an upwardly extending frame 6 which is secured to the vehicle at the proper elevation by cables 7. The boom has a rearwardly extending portion 8 from which the tongs cable extends. This rearwardly extending portion 8 has a concaved lower face 9 for engaging the ends of the logs. The details of this loading vehicle and boom are not part of the present invention and will not be further described herein. The present invention is embodied in the device 10 upon which the logs are loaded as shown in Figure 1.

The device 10 comprises a base frame 11 which is a flat bottomed metal pan turned up at its forward end. The pan has a swivelled towing bar mount 12 at the forward end which is secured in a front frame portion 13 of the pan by a pivot pin 14. A towing bar 15 is secured between the side portions 12a and 12b of the mount 12 by a pin 16 which can be removed and placed in different openings to vary the height to which the towing bar 15 is held.

Figure 4:
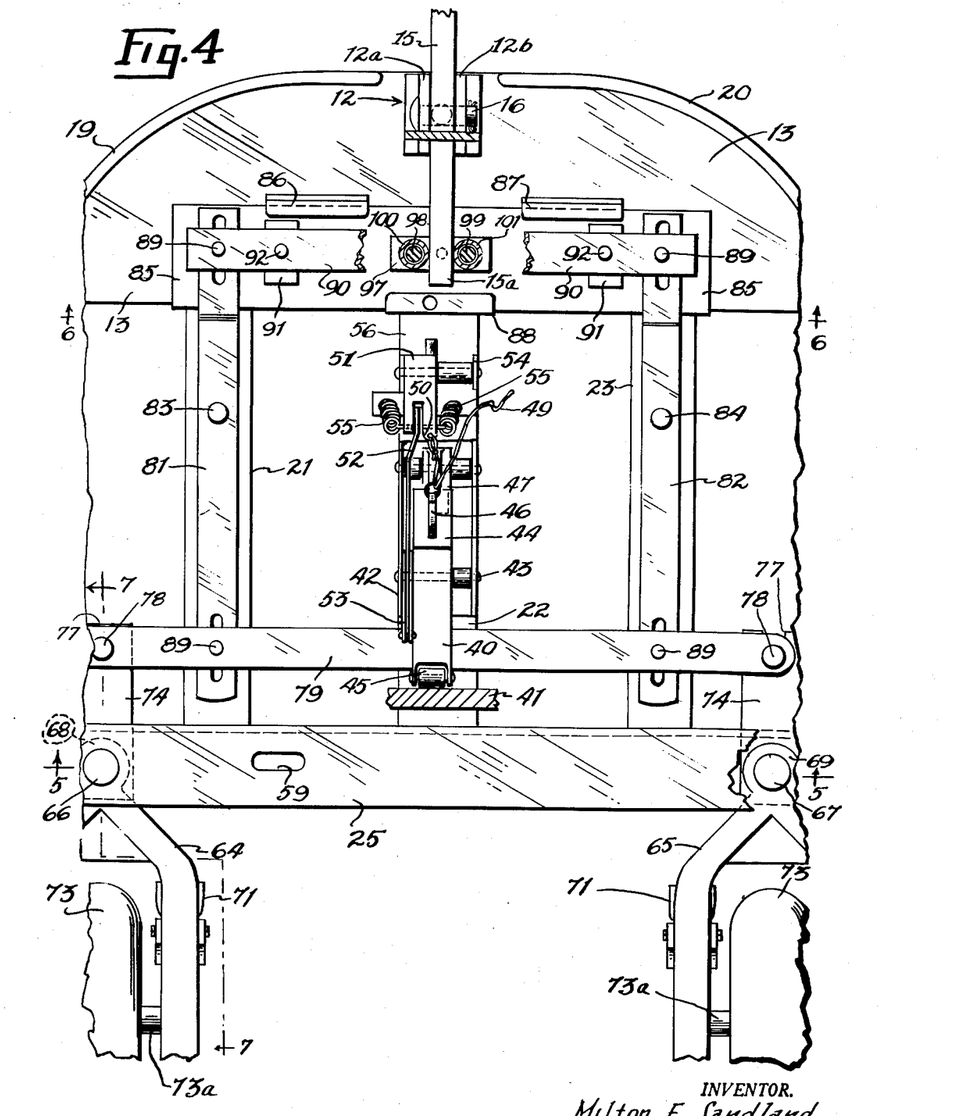
Figure 4 is a fragmentary plan sectional view taken substantially on the line 4—4 of Figure 2.

The sides 17 and 18 of the pan 11 extend upright and are reenforced at the top edges as indicated at 19 and 20. It is essential for a device of this sort that all parts be of rugged construction because of the severe strains put upon them. The pan 11 is rounded at the forward end as indicated best by Figures 4 and 11 and the side walls 17 and 18 follow the rounded contour of the pan to a point adjacent to the tow bar mount 12. Within the pan 11 the structure is additionally reenforced by three longitudinally running ribs indicated at 21, 22 and 23 (see Figure 4). Across the rear end of the pan 11 is an upright plate 24 which has a top flange 25 extending rearwardly therefrom. The bottom of the pan 11 is thickened at 26 directly beneath the cross plate 24 and this thickened portion extends rearwardly parallel to the flange 25. Ribs 27 are provided on the bottom of the pan.

Figure 2:
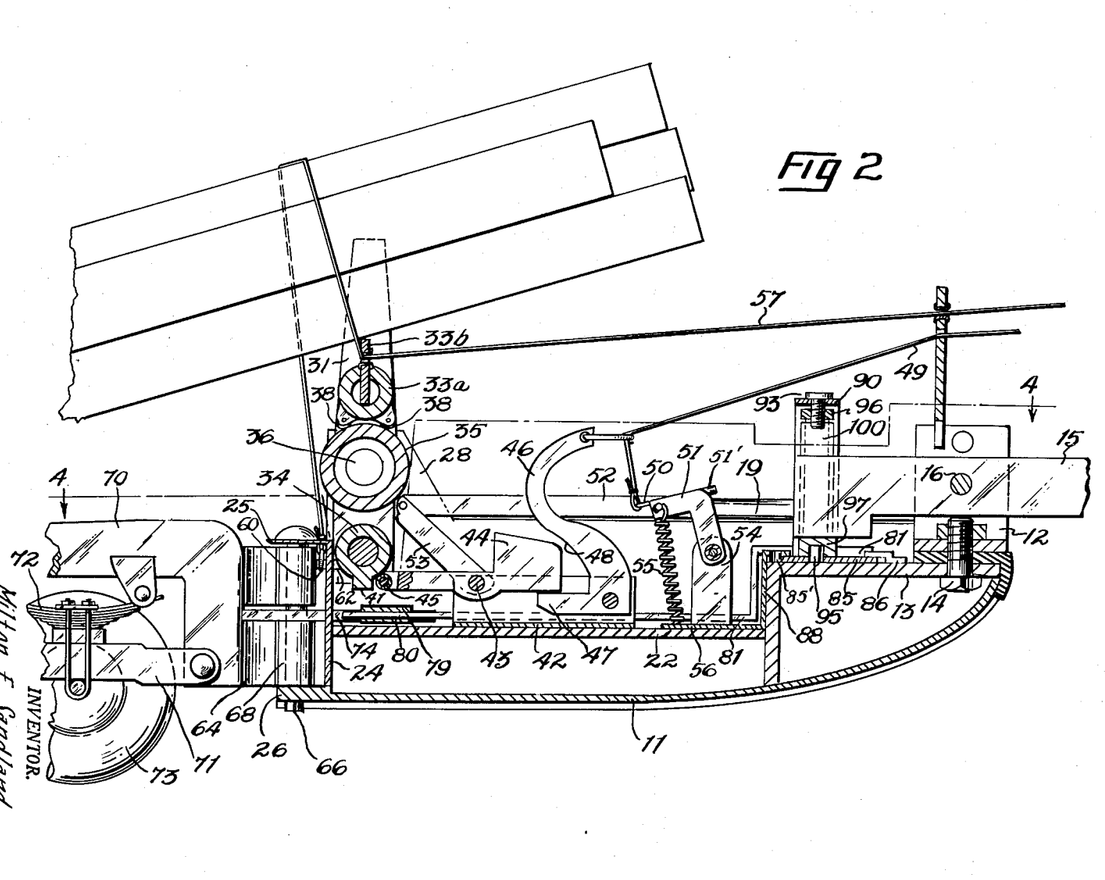
Figure 2 is a longitudinal sectional view of the log skidding device showing the parts in the position where the logs are carried and dragged.
Figure 3:
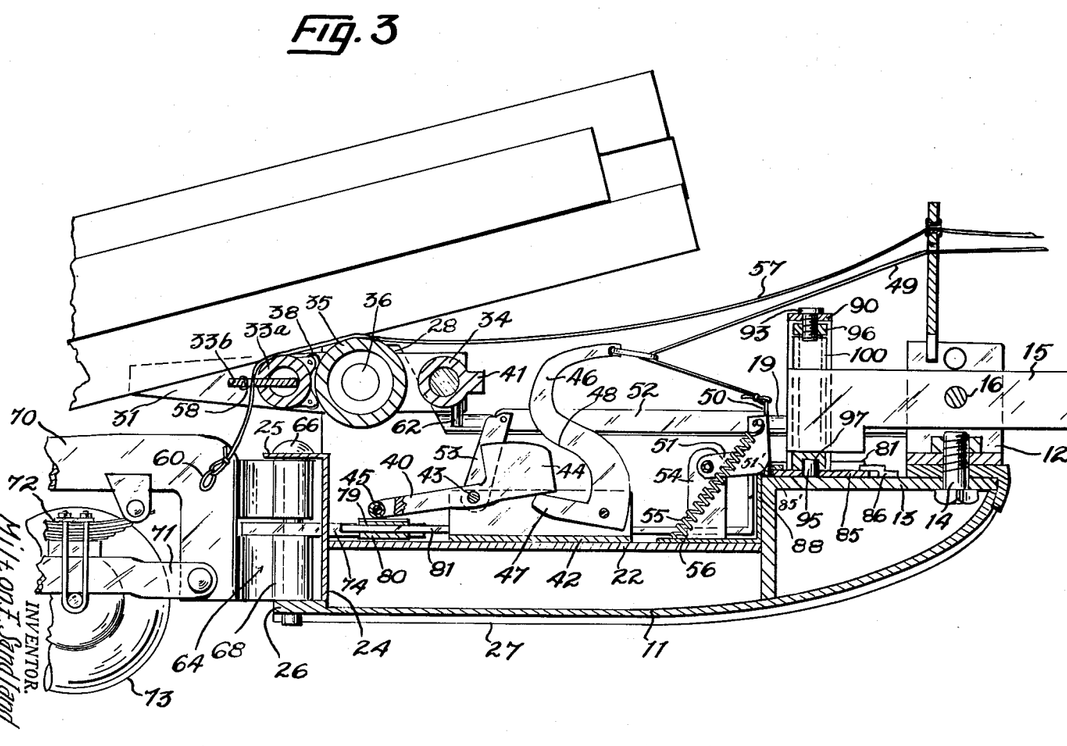
Figure 3 is a sectional view similar to Figure 2, but showing the position of the parts when the logs are being released at the unloading point.

The side walls 17 and 18 are extended to their highest level immediately in front of the cross plate 24, to provide upright supports 28 and 29 for the mounting of a log bunk 30 on which the logs are supported as illustrated in Figures 1, 2 and 3.

Figure 5:
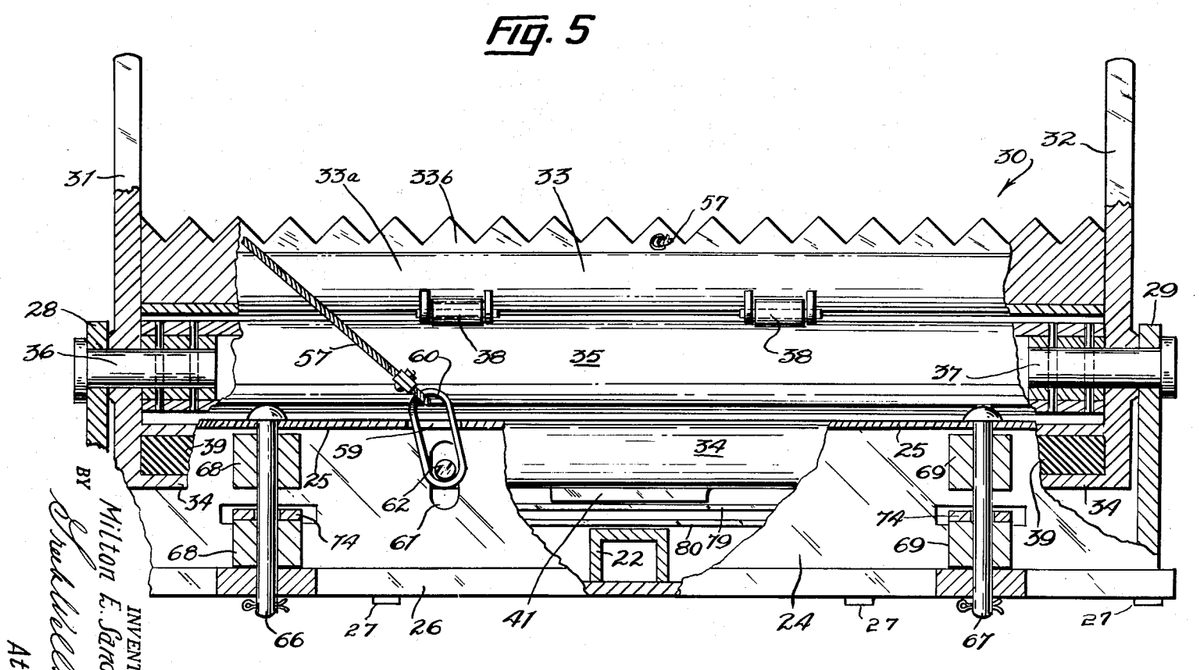
Figure 5 is a sectional view taken through the rear portion of the device substantially on the line 5—5 of Figure 4 with certain parts being broken away to illustrate more clearly the bunk construction.
Figure 8:
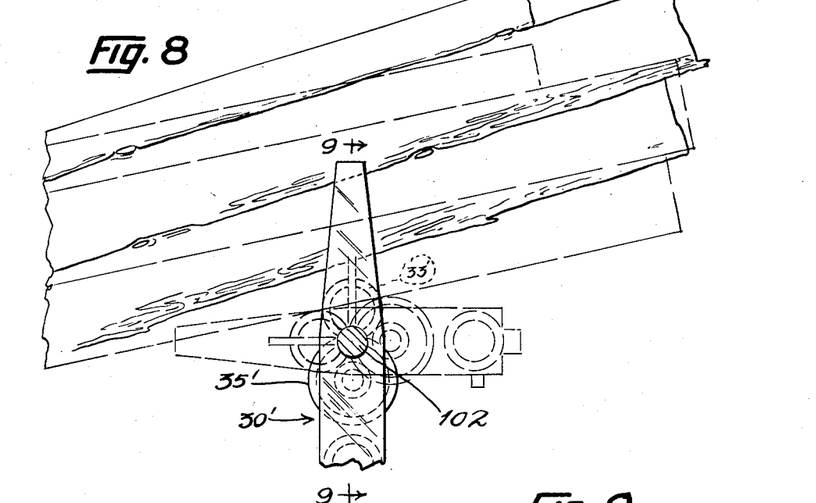
Figure 8 is a fragmentary view in side elevation of a modified bunk construction.
Figure 9:
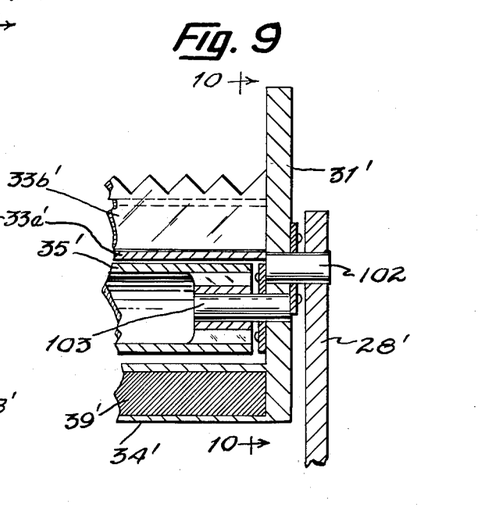
Figure 9 is a fragmentary sectional view on the line 9—9 of Figure 8 illustrating the bunk attachment of the skid pan.
Figure 10:
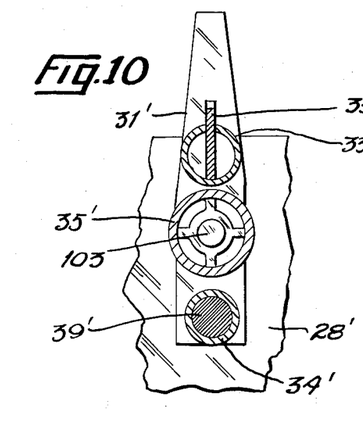
Figure 10 is a sectional view on the line 10—10 of Figure 9.

The details of the log bunk 30 are illustrated best in Figures 2, 3 and 5 of the drawings. The bunk comprises two end stakes 31 and 32 which are connected together by a log supporting bar 33 and a bottom bar 34. An intermediate roller 35 is pivoted to the end stakes 31 and 32 so that it is free to turn. Pivot pins 36 and 37 are secured in the ends of the roller 35 and are rotatably mounted in the uprights 28 and 29 and in the end stakes 31 and 32 in the form of the invention shown in Figure 5. As illustrated in Figures 8, 9 and 10, separate pivots may be provided for mounting the bunk in the uprights 28 and 29 and for mounting the roller in the end pieces of the bunk. The log supporting bar 33 is a tube 33a with a toothed plate 33b set into it. The teeth of the plate 33b will penetrate the logs loaded thereon so as to oppose sliding of the logs on the bar 33. In order to increase the resistance of the bunk to deformation due to logs dropping on it, the bar 33 has pairs of rollers 38 at spaced points intermediate its ends. These rollers 38 are so mounted as to engage the roller 35 so that the additional strength of the roller 35 will oppose deformation of the bar 33. The normal position of the bunk 30 is upright and means are provided for maintaining it in upright position. The lower bar 34 preferably is filled with a heavy material indicated at 39 in Figure 5, so that it may act as a counterweight to bring the bunk into the upright position. However, any suitable means may be used for this purpose. The bunk is latched in upright position by a latch member 40 which is adapted to engage a projection 41 on the bottom of the bar 34. The latch member 40 is pivoted in a channel 42 by a pivot pin 43. The channel 42 is mounted on top of the reenforcing member 22. The latch member 40 has a weight 44 at one end which normally tends to raise a roller 45 at its other end into engagement with the projection 41. It is evident that when the roller 45 is in engagement with the projection 41 as illustrated in Figure 2, the bunk 30 is latched in upright position for dragging logs loaded thereon.

In order to release the latch member 40, I provide a trip lever 46 which is pivoted in the channel 42. The trip lever 46 has a finger 47 extending beneath the weight 44 for engaging the weight and lifting it to move the latch member 40 down out of the way of the projection 41. The lever 46 also has a portion 48 which is curved over the weight 44 so that when the lever 46 moves to the position shown in Figure 2, it will strike the top of the weight 44 so as to cause the weight to move down in the event it is stuck.

The lever 46 is operated by a trip cable 49 together with a toggle mechanism which will now be described. The function of the toggle mechanism is in part one of forcing the bunk 30 into proper position for the latch member 40 to lock it upright. The cable 49 has its end attached to a projection 50 on an L-shaped lever 51. A link 52 is pivoted to the lever 51 adjacent to the projection 50 and extends toward the bunk 30. A second link 53 is pivoted to the rear end of the link 52 and to the pivot pin 43 which also pivotally mounts the latch member 40. The lever 51 is pivoted on uprights 54 which project upwardly from the reenforcing member 22. Two springs 55 are so connected between the upper end of the lever 51 and the base 56 of the uprights 54 as to form with the lever 51 a toggle mechanism. When the parts are in the position illustrated in Figure 2 and the operator pulls on the cable 49, he will move the lever 46 clockwise to lift the weight 44 and release the latch member 40 from the projection 41. The drag of the logs on the bunk 30 will then turn the bunk on its pivot and the lower bar 34 of the bunk will engage the link 53 as the bunk swings to its lowered position. The bar 34 will thus move the links 53 and 52 to the right from the position shown in Figure 2, far enough to bring springs 55 over the pivot of the lever 51 to the uprights 54 and this will cause the lever 51 to assume the position shown in Figure 3. As soon as the logs leave the bunk 30, the bunk returns by force of gravity toward an upright position because of the excessive weight of the bar 34. Then the operator again pulls the trip cable 49. This makes sure that the lever 46 will hold the latch member 40 down. Likewise the pull will lift the lever 51 until the springs 55 pass over center when they will urge the lever 51 and the links 52 and 53 to the left. The operator then releases the cable 49 after a quick jerk and the lever 46 will drop back to its original position so that the latch member 40 moves up into engagement with the projection 41.

The logs are held on the bunk 30 by a squeeze cable 57 which extends through an aperture 58 in a toothed plate 33b of the bunk. This squeeze cable 57 is passed over the logs and then passes down through an aperture 59 in the flange 25. The aperture 59 is an elongated narrow aperture and the squeeze cable 57 has a link 60 secured to the end for extending through the aperture 59. The rear cross wall 24 is apertured at 61 for the passage of a pin 62 which is mounted on the bar 34. When the logs are loaded, the operator passes the cable 57 over the logs and then passes the link 60 down through the aperture 59 and hooks it over the pin 62. The squeeze cable 57 runs forward to a winch on the powered vehicle and is drawn tight by the winch to hold the logs on the bunk 30. When the bunk is released for unloading it swings away from the cross plate 24, thus withdrawing the pin 62 out of the link 60 and the squeeze cable 57 is released.

The pan 11 can be wheel supported or dragged on the ground. It is shown with two wheel frames 64 and 65 which are connected to the rear portion 26 of the pan 11 and to the flange 25 by removable pivot pins 66 and 67 that pass through the forward portions 68 and 69 of the wheel frames 64 and 65. Each wheel frame comprises a portion 70 which is bifurcated and which is rigidly secured to its pin mounting portion 68 or 69. A wheel mounting U-shaped frame 71 is pivoted on the portion 70 at its ends and leaf springs 72 are interposed between the portions 70 and 71 to form a spring support of the frame 70 on the wheel frame 71. Wheels 73 have their axles 73a secured to the wheel frames 71.

In order to guide the wheels 73, each frame 70 has a forwardly extending bar 74 fixed thereto. The bar 74 has an aperture at 75 for the connecting pin such as 66 or 67 and extends forward through an aperture 76 in the cross plate 24. The bars 74 at their forward ends are divided at 77 to receive pins 78 that are secured in and connected to cross bars 79 and 80 adjacent the rear of the pan 11. The cross bars 79 and 80 are connected to two forwardly running bars 81 and 82 that are pivoted on the reenforcing members 21 and 23 by pivots 83 and 84 shown best in Figure 4. The bars 81 and 82 extend forwardly and then are bent upwardly over the front cross member 13 and over a plate 85 that is slidably mounted on the top of the cross member 13. Guides 86, 87 and 88 are provided for the plate 85 to guide it for longitudinal movement along the top surface of the member 13. The bars 81 and 82 are slotted at their opposite ends to receive pins, all of which are indicated by the numeral 89, to connect the bars to the cross bars 79 and 80 at their rear ends and to the plate 85 at their front ends.

Figure 6:
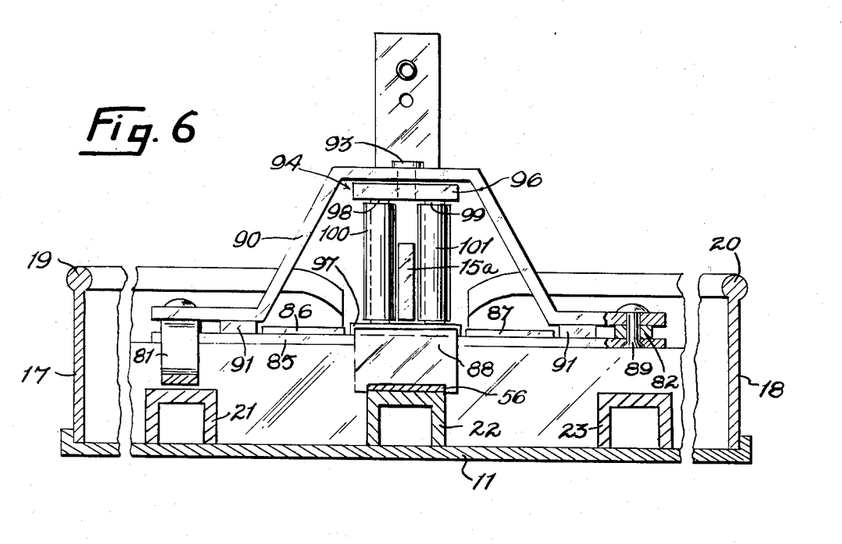
Figure 6 is a fragmentary sectional view taken substantially on the line 6—6 of Figure 4.
Figure 7:
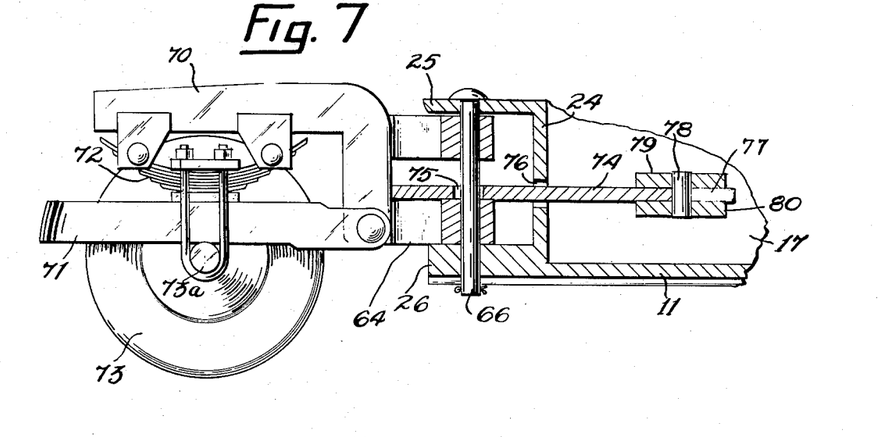
Figure 7 is a sectional view taken on a vertical plane through one of the rear wheel mounts illustrating how the wheels are attached.

The plate 85 is adapted to be moved to and fro by the tow bar 15. The mechanism by which this is accomplished is shown best by Figures 2, 4 and 6. A strap 90 is secured to the plate 85 by blocks 91 and rivets 92. The front pins 89 also connect the strap 90 and the plate 85 in addition to serving as means to link the plate 85 to the bars 81 and 82. Intermediate the blocks 91, the strap 90 is bent upwardly and horizontally to provide a mount for a pivot pin 93 that pivots the upper end of a roller frame 94. The lower end of the roller frame 94 is pivotally mounted by a pivot pin 95 on the plate 85. The roller frame 94 comprises upper and lower plates 96 and 97 and connecting pins 98 and 99. Rollers 100 and 101 are journalled on the pins 98 and 99. The tow bar 15 has its rear portion enlarged as indicated at 15a and this rear portion 15a extends between the rollers 100 and 101. It will be recalled that the tow bar 15 is secured in the swivelled member 12. As the tow bar swings about the pivot provided by the member 12, it will move the rear portion 15a thereof to the right or left and in so doing, will slide the plate 85 to the right or left. If the front end of the tow bar moves to the right, the plate 85 is shifted to the left, this in turn moves the bars 81 and 82 about their pivots to shift the front ends of the guide bars 74 to the right. This is the correct direction to guide the wheels 73 when they are being towed by a track laying type of powered vehicle. The steering of the skidding device is thus accomplished automatically from the tow bar by the mechanism just described.

In unloading of the logs it is some times desirable to reduce the shock which is occasioned by the lowering of the toothed log supporting bar to bring the roller 35 into engagement with the logs. Figures 8, 9 and 10 illustrate a construction which accomplishes this purpose. In these figures the bunk 30' is pivoted by a pivot member 102 to the uprights such as 28'. The roller 35' is then pivoted to the end stakes such as 31' or 32' by a separate pivot 103 which is offset downward. With this construction the action is as illustrated by the full and dotted line positions in Figure 8. When the bunk is released or let down the log supporting bar 33' moves to the rear and the bunk turns about the pivot pin 102. This raises the roller 35' from the full line position shown in Figure 8 to the dotted line position shown in Figure 8, thus reducing the distance that the logs drop by a substantial amount. It is of course, apparent that with this arrangement the roller 35' will carry only a portion of the weight of the logs when the bunk is let down for unloading. The remainder of the weight will ride on the rounded side portions of the log support bar 33'. In general, however, this will sufficiently reduce the friction of the logs on the bunk to cause them to unload without any difficulty.

Figure 11:
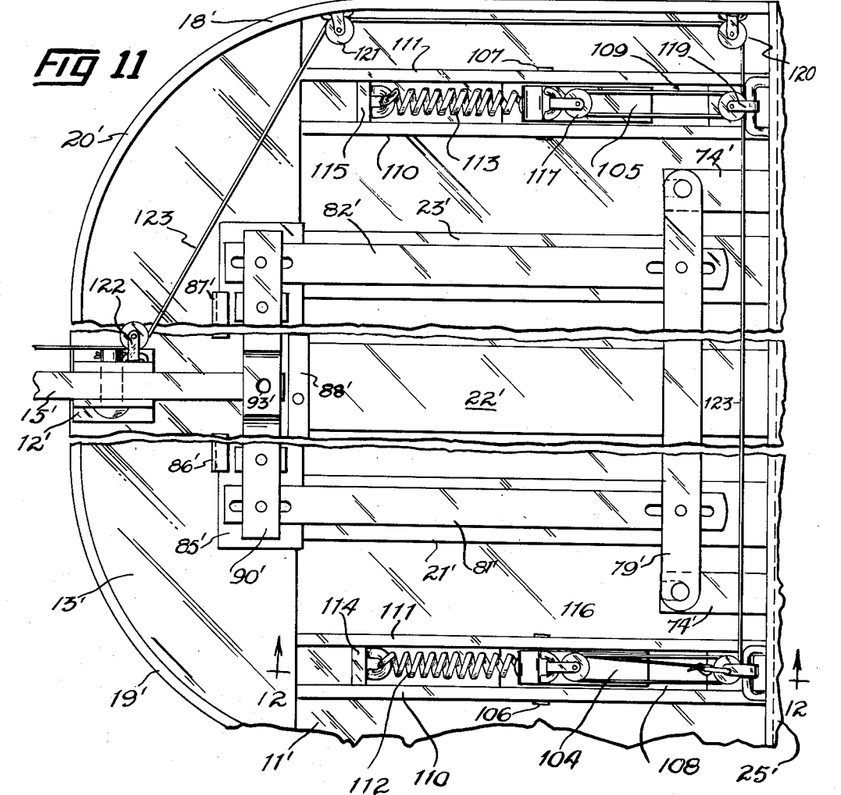
Figure 11 is a plan sectional view similar to Figure 4 with the control mechanism left off but showing the brake mechanism provided for preventing the device from over-running the towing vehicle when it is used as a skid pan on steep ground.
Figure 12:
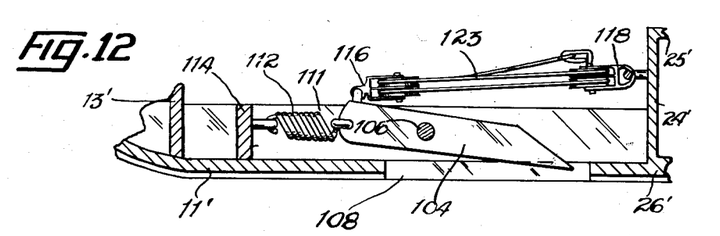
Figure 12 is a fragmentary sectional view on the line 12—12 of Figure 11.

Referring now to Figures 11 and 12, in these figures the pan 11' is shown as equipped with a braking mechanism. This braking mechanism comprises two pivoted grouser teeth 104 and 105 which are carried on pins 106 and 107 in position to project down through openings 108 and 109 cut in the bottom of the pan 11'. The pins 106 and 107 are pivoted in bars 110 and 111 that are secured to the pan surface. Springs 112 and 113 connect the upper ends of the teeth 104 and 105 to anchors 114 and 115 that are provided between the bars 110 and 111. These springs normally hold the teeth 104 and 105 retracted. In order to project the teeth so as to act as a brake, I provide on each tooth a pulley block. The pulley block 116 is on the tooth 104 and the pulley block 117 is on the tooth 105. A pulley block 118 is anchored to the cross plate 24'. Another pulley block 119, having an extra sheave, is anchored to the cross plate 24' back of the tooth 105. Single guide pulleys 120 and 121 are provided along the side 18' of the pan and a single guide pulley 122 is provided on the swivelled tow bar mount 12'. A cable 123 has its ends secured to the pulley block 118 and is trained around the blocks 116 and 118, it then goes across to the three sheave pulley block 119 and around the block 117 which is a two sheave block and finally goes to the guide pulleys 121 and 122 and forwardly from the skidding device so it can be operated by the driver of the towing vehicle.

The modification of the log skidding device illustrated in Figures 13 to 19 inclusive provides a relatively inexpensive means for obtaining certain of the advantages of my invention. In this modification the skid pan 125 is provided with a revolving bunk 126 which supports the logs in essentially the same manner as the bunk 30 of the main form of the invention. The revolving bunk 126 comprises a main tubular member 127, a toothed bar 128 inserted in the member 127, end stakes 129 and 130 welded to the member 127 and weights 131 and 132 secured on the member 127 in position to cause the bunk 126 to assume a position with the end stakes 129 and 130 upright when the bunk is free of load. Spaced standards 133 and 134 have bearings 135 and 136 thereon rotatably mounting the member 126. End thrust collars 137 and 138 are provided on the member 126 to keep it from moving endwise in the bearings 135 and 136.

Figures 13, 14, 15, 16, 17, 18, 19:
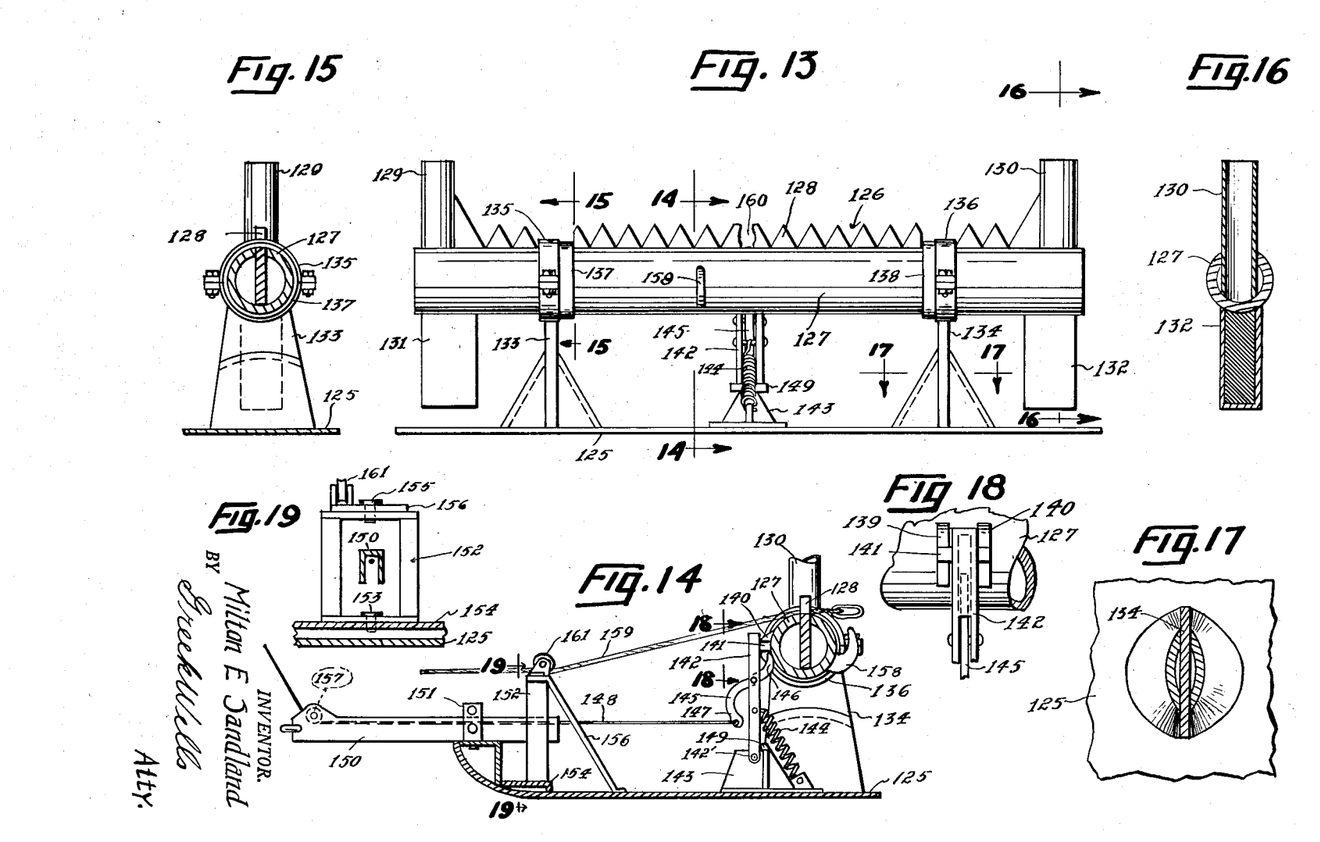
Figure 13 is an end view of a modified log skidding device.
Figure 14 is a sectional view taken on the line 14—14 of Figure 13.
Figure 15 is a sectional view taken on the line 15—15 of Figure 13.
Figure 16 is a sectional view taken on the line 16—16 of Figure 13.
Figure 17 is a fragmentary sectional view taken on the line 17—17 of Figure 13.
Figure 18 is a fragmentary view looking at the log bunk from the line 18—18 of Figure 14.
Figure 19 is a fragmentary sectional view taken on the line 19—19 of Figure 14.

In order to secure the bunk 126 with the teeth of the bar 128 upright, I provide a latch mechanism which comprises two lugs 139 and 140 on the member 126. These lugs are slotted to receive a cross bar 141 that is fixed on a latch member 142. The latch member 142 is a steel channel which is pivotally mounted by a pivot pin 142' on a base plate 143 that is secured to the skid pan 125. The member 142 is urged clockwise as seen in Figure 14 by a spring 144 so that its cross bar 141 will rest in the slots in the lugs 139 and 140 and keep the member 126 from rotating when the logs are loaded on it and dragged by hitching a powered vehicle to the skid pan. In order to release the latch member 142, I provide a lever 145 which has its upper end 146 positioned to press against the tubular member 127. The lower end 147 of the lever 145 has a trip line 148 secured to it and this trip line is extended forwardly to the towing vehicle so that the operator can trip the latch member 142 when he reaches the loading dock and thus releases the bunk 126 for rotation. It will be noted that the midportion of the toothed bar 128 is cut away to permit the end 146 of the lever 145 to pass as the bunk rotates. A stop member 149 is provided on the base 143 to limit the rearward travel of the latch member 142 under pressure of the spring 144.

The skid pan 125 has a tow bar 150 in the form of an inverted channel pivotally secured by a swivelled member 151 to the front end of the skid pan. The rear end of the tow bar 150 projects into a pivoted yoke 152 which is pivoted by a lower pin 153 to a cross ledge 154 on the skid pan. The upper end of the yoke 152 is pivoted by a pin 155 to a brace 156 that is secured on the skid pan. The brace 156 is a relatively wide heavy plate which has adequate strength to protect the tow bar in the event that a log is lowered onto it. The trip line 148 passes through the tow bar 150 which has a pulley 157 mounted in the front end thereof for guiding the trip line. The side members of the yoke 152 serve to limit the tow bar in its pivotal movement with respect to the skid pan but it allows a certain amount of freedom of movement of the tow bar so that it is easy to line up the tow bar with the draw bar of the towing vehicle.

The bunk 126 is adapted to the use of a squeeze line 159 for holding the logs on it. For this purpose the rear side of the member 127 has a hook 158 thereon to receive a link at the end of the squeeze line 159 such as that shown in the main form of the invention. The squeeze line 159 is not threaded through an eye in the member 128 since that would cause it to wind around the bunk as the bunk is rotated. The squeeze line instead merely passes through the slot 160 provided at the center of the member 128. The squeeze line is extended downwardly and guided through a pulley 161 that is carried by the brace 156 so that the squeeze line will not tend to jump out of the slot 160 when the bunk is loaded with logs.

The operation of the main form of the invention and the modification shown in Figures 13 to 19 inclusive, is essentially the same. When the skidding device is ready for loading, the bunk is in upright position and is latched there by the latch bar 40 of the main form of the invention and by the latch member 142 in the modification. In the main form of the invention rotation of the bunk in a forward direction is prevented by engagement of the end stakes 31 and 32 with the wall 24 of the skid pan. In the modification, the latch member 142 serves to prevent rotation of the bunk in either direction. When the logs are loaded on the bunk, they are tied down by the squeeze line 57 or 159 and the skid pan is hitched to the towing vehicle for transportation of the logs to a loading dock. When the loading dock is reached, all the operator has to do to unload is to pull the trip line 49 or 148 so as to release the bunk 30 or 126. Further forward movement of the skid pan will then cause the bunk to turn.

In the main form of the invention when the bunk turns, the logs are lowered onto the roller 35 and the roller simply turns as the skid pan is pulled out from beneath the logs. As soon as the logs are discharged, the bunk 30 will right itself due to the weight in the member 34. In the main form of the device the tow bar is locked against pivoting on the pan during unloading. This locking is accomplished by a pin 51' on the member 51 and an aperture 85' in the sliding plate 85. As soon as the logs are unloaded the operator again pulls on the trip line 49, throwing the member 51 from the position shown in Figure 3, back to the position shown in Figure 2. The springs 55 of course, aid in the latter part of this movement. When the trip line 49 is then released, the lever 46 will drop back and the weight 44 will move down to bring the latch bar 40 up into position to secure the bunk 30 upright in loading position.

Whenever the skid pan is to be used without the wheels 73, the operator can remove the wheels by blocking up the skid pan and removing the pins 66 and 67. The entire wheel mounts can then be removed rearwardly away from the skid pan, leaving it free to be used without the wheels. The slotted forward ends 77 of the bar 74 permit the bar 74 to disengage the pins 78.

In the modified form of the invention the operator unloads at the loading dock by pulling the trip line 148 causing the lever 145 to force the latch member 142 away from the bunk 126, until the cross bar 141 is out of the slots in the lugs 139 and 140. This releases the bunk 126 so that it can rotate in the bearings 135 and 136. The drag of the logs will cause the bunk to rotate. As the bunk rotates, the squeeze line 159 is released from the hook 158 so that it no longer binds the logs. The operator must hold the trip line 148 taut so that the bunk can rotate free until the logs are discharged and the bunk returns under the influence of the weights 131 and 132 to upright position. The release of the trip line 148 will then allow the latch member 142 to again secure the bunk against rotation.

It is believed that the nature and advantages of my invention will be apparent from the foregoing description.

Having thus described my invention, I claim:

1. A log skidding device comprising a skid pan, upstanding bunk supports at the sides of said pan, a log supporting bunk comprising end stakes, a log holding member extending between and connecting said stakes, said member including a sharp edged bar for dragging the logs and a roller below the sharp edged bar, pivot members mounting the bunk on said supports, a holding device cooperating with said pivot members to hold the sharp edged bar above the roller while dragging logs on said bar and means to release said holding device so the dragged logs will turn the bunk and bring the roller against the logs.

2. A log skidding device comprising a skid pan, a log dragging bunk mounted on said pan for movement between an upright log dragging position and a trailing, log discharging position, a binding cable for binding logs on said bunk, a cable guide at the top of the bunk when it is in log dragging position for guiding the cable across the bunk so that the end of the cable may be run around the logs and secured, means on the bunk to secure the end of said cable, and means, operable by movement of the bunk from upright position, to release the cable end from the bunk.

3. A log skidding device comprising a skid pan, a log dragging bunk mounted on said pan for movement between an upright log dragging position and a trailing, log discharging position, remotely controlled latch means holding the bunk in upright position, a binding cable for binding logs on said bunk, a cable guide at the top of the bunk when it is in log dragging position for guiding the cable across the bunk so that the end of the cable may be run around the logs and secured, means on the bunk to secure the end of said cable, and means, operable by movement of the bunk from upright position, to release the cable end from the bunk.

4. A log skidding device comprising a skid pan, a tranverse log dragging bar above the pan, supports on the pan for said bar having pivots for the bar offset downwardly from the log receiving top of the bar when the bar is in log receiving position, counterweight means fixed to the bar operable to bring the bar, when it is free to turn on the pivots, into log receiving position, cooperating members on the bar and pan to prevent rotation of the bar from log receiving position, and a roller between the bar and the counterweight means in position to support logs when the bar turns on its pivots out of log receiving position.

5. A log skidding device comprising a skid pan, a transverse log dragging bar above the pan, end stakes fixed to said bar, supports on the pan for said bar having pivots for mounting the end stakes for rotation on the supports, the pivots being offset downwardly from the log receiving top of the bar when the bar is in log receiving position, cooperating members on the bar and pan to prevent rotation of the bar from log receiving position, and a roller journalled for rotation in said end stakes in position to support logs when the bar turns on its pivots out of log receiving position, said roller and said bar having a common axis.

6. A log skidding device comprising a skid pan, a transverse log dragging bar above the pan, supports on the pan for said bar having pivots for the bar offset downwardly from the log receiving top of the bar when the bar is in log receiving position, cooperating means on the bar and pan to prevent rotation of the bar from log receiving position, and a roller beneath the bar in position to support logs when the bar turns on its pivots out of log receiving position, the bar having pivots thereon, on which the roller is journalled for rotation.

7. A log skidding device comprising a skid pan, a log bunk extending transversely across the pan, spaced supports on the pan on which the log bunk is pivotally mounted, teeth on said bunk for engaging logs laid on the bunk and preventing endwise sliding thereof, releasable means securing the bunk against rotation with the teeth uppermost, a squeeze cable, means to secure one end of the cable to the bunk, an eye on the bunk through which the cable extends to squeeze logs on the bunk together, and means on the pan, operating to release the end of the cable upon rotation of the bunk.

8. A log skidding device comprising a skid pan, a log bunk extending transversely across the pan, spaced supports on the pan on which the log bunk is pivotally mounted, a toothed bar on said bunk, means to secure the bunk against rotation with the toothed bar uppermost, trailing wheels supporting the rear end of said pan, a towing bar pivotally mounted on the front end of the pan to turn about an axis vertical to the pan, and means connecting the towing bar and wheels, maintaining the wheels parallel to the towing bar as the towing bar turns on its pivot.

References Cited in the file of this patent

UNITED STATES PATENTS

| | | |
|---|---|---|
| 141,098 | Abeel | July 22, 1873 |
| 726,325 | Miller et al. | Apr. 28, 1903 |
| 772,234 | Hancock | Oct. 11, 1904 |
| 1,105,631 | Drain | Aug. 4, 1914 |
| 1,874,007 | Heaton | Aug. 30, 1932 |
| 1,909,689 | Kuchar | May 16, 1933 |
| 1,987,688 | Lamb | Jan. 15, 1935 |
| 2,413,048 | Hurd | Dec. 24, 1946 |
| 2,643,012 | Wahl | June 23, 1953 |

FOREIGN PATENTS

| | | |
|---|---|---|
| 446,374 | Great Britain | Apr. 29, 1936 |